United States Patent [19]

Mitchell

[11] Patent Number: 5,713,175
[45] Date of Patent: Feb. 3, 1998

[54] PROTECTIVE FLOORING

[76] Inventor: Steven Glenn Mitchell, 5591 Mountain View Ave., Yorba Linda, Calif. 92686

[21] Appl. No.: 497,017

[22] Filed: Jun. 30, 1995

[51] Int. Cl.⁶ ............................. E04C 5/00; E01C 5/18
[52] U.S. Cl. ................... 52/582.1; 52/177; 52/391; 52/392; 52/506.01; 52/584.1; 52/585.1; 108/156; 403/292; 403/294; 403/DIG. 10
[58] Field of Search ................... 52/102, 166, 169.9, 52/177, 263, 390, 391, 392, 403.1, 506.01, 506.06, 506.08, 582.1, 584.1, 585.1; 108/156, 157; 403/251, 264, 292, 293, 294, DIG. 10

[56] References Cited

U.S. PATENT DOCUMENTS

| | | | |
|---|---|---|---|
| 841,998 | 1/1907 | Mulford | 52/584.1 |
| 2,377,211 | 5/1945 | Cocken, Jr. | |
| 2,931,214 | 4/1960 | Maccaferri | 52/390 X |
| 2,999,431 | 9/1961 | Mitchell | 52/392 X |
| 3,296,764 | 1/1967 | Tremblay | 52/584.1 |
| 3,594,969 | 7/1971 | Kantorowicz | 52/392 |
| 3,694,983 | 10/1972 | Couquet | |
| 3,950,908 | 4/1976 | Van Eyk | 52/506.01 X |
| 4,018,025 | 4/1977 | Collette | |
| 4,468,910 | 9/1984 | Morrison | |
| 4,497,858 | 2/1985 | Dupont et al. | |
| 4,848,058 | 7/1989 | Mullen | 52/583.1 |
| 4,860,510 | 8/1989 | Kotler | 52/177 |
| 4,921,741 | 5/1990 | Mullen | 428/48 |
| 5,070,662 | 12/1991 | Niese | |
| 5,215,802 | 6/1993 | Sijpesteign | |
| 5,403,637 | 4/1995 | Pickard et al. | 52/177 X |

FOREIGN PATENT DOCUMENTS

| | | | |
|---|---|---|---|
| 704199 | 2/1965 | Canada | 52/584.1 |
| 8503314 | 6/1987 | Netherlands | 52/102 |

*Primary Examiner*—Carl D. Friedman
*Assistant Examiner*—Kevin D. Wilkens

[57] ABSTRACT

A protective flooring which includes a plurality of floor segments wherein each one of the floor segments has a top surface, a bottom surface, and an interior peripheral edge. At least one anchor connected to and depending from the bottom surface of selected ones of the segments, each one of the anchors comprises an elongate cylindrical tube with a central bore, and apertures that provide communication with the bore. Each floor segment includes at least one notch in the peripheral edge thereof, a base connector affixed to the bottom surface of the floor segment defined by the notch. When the floor segments are assembled, the notches in the peripheral edges of the adjacent floor segments correspond so that the respective base connectors are proximate to each other. A U-shaped connector engages each proximate pair of corresponding base connectors so as to join together the adjacent floor segments.

8 Claims, 3 Drawing Sheets

PROTECTIVE FLOORING

BACKGROUND OF THE INVENTION

The invention pertains to protective flooring that helps cushion a fall by a person using playground equipment or the like. More specifically the invention concerns protective flooring, as described above, that comprises a plurality of floor segments securely joined together to form a complete section of protective flooring that is securely attached to the ground.

Playground equipment, such as, for example, jungle gyms and the like, require that the user be a distance above the ground. The user can often be at least several feet above the ground during the use of this type of playground equipment. If the user loses their grip or loses their balance, there is a chance that they will fall from the playground equipment and strike the ground. When a user strikes the ground, there is a potential for injury. It thus becomes apparent that there is a need for a protective flooring that will help cushion the user's fall, and thus, help reduce the potential for injury.

Many times playground equipment for which a protective flooring would be beneficial is located outdoors in a playground. Because the playground is outdoors, the protective flooring may be subjected to a wide variety of temperature changes. There could be over a 120 degree (Fahrenheit) temperature change between the coolest winter days and the hottest summer days. Thus, any protective flooring used in conjunction with outdoor playground equipment should be able to withstand these temperature differences and not suffer degradation.

Playground equipment located outdoors, especially in public playgrounds, is subject to vandalism and theft. It is not unusual for protective flooring to be torn up and stolen. Thus, it would be desirable to provide a protective flooring that is resistant to vandalism in that the flooring itself is difficult to destroy. It would be desirable to provide a protective flooring that is difficult to remove from the ground (or playground surface) once affixed thereto.

Playground equipment varies in size and shape. Consequently, a protective flooring used in conjunction with playground equipment should have sufficient design flexibility to accommodate different types and styles of playground equipment.

SUMMARY OF THE INVENTION

It is an object of the invention to provide an improved protective flooring that helps cushion a fall.

It is another object of the invention to provide an improved protective flooring that can withstand the environmental demands of being outdoors.

It is still another object of the invention to provide an improved protective flooring that is resistant to vandalism.

It is an object of the invention to provide an improved protective flooring that has design flexibility.

In one form thereof, the invention is a protective flooring comprising a plurality of floor segments wherein each one of the floor segments has a top surface, a bottom surface, and an interior peripheral edge. At least one anchor connected to and depending from the bottom surface of selected ones of the segments, each one of the anchors comprises an elongate cylindrical tube with a central bore, and apertures that provide communication with the bore. Each floor segment includes at least one notch in the peripheral edge thereof, a base connector affixed to the bottom surface of the floor segment defined by the notch. When the floor segments are assembled, the notches in the peripheral edges of the adjacent floor segments correspond so that the respective base connectors are proximate to each other. A U-shaped connector engages each proximate pair of corresponding base connectors so as to join together the adjacent floor segments.

BRIEF DESCRIPTION ON THE DRAWINGS

The following is a brief description of the drawings that form a part of this patent application:

DETAILED DESCRIPTION OF A SPECIFIC EMBODIMENT

Figure 1:
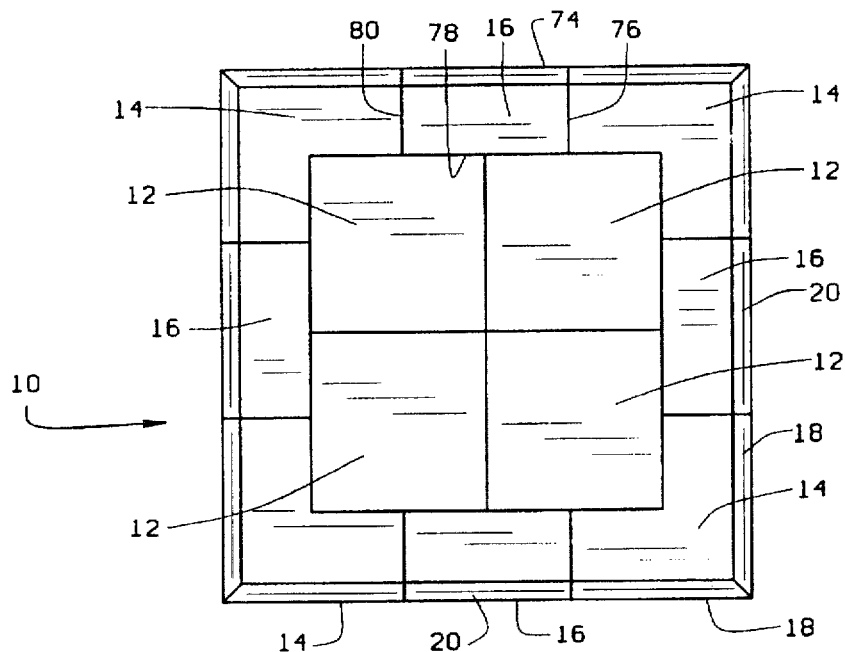
FIG. 1 is a top view of a flooring segment of the specific embodiment of the invention.
Figure 4:
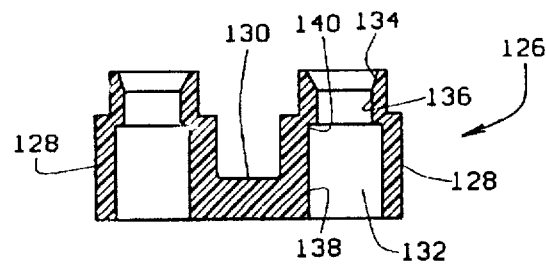
FIG. 4 is a cross-sectional view of a U-shaped connector.

Referring to the drawings, FIG. 1 illustrates one style of completely assembled protective flooring, generally designated as 10. In this specific embodiment, flooring 10 includes four interior square floor segments 12 that comprise the interior of the flooring 10. The flooring further includes four corner floor segments 14 that are located at the four corners of the flooring 10. The flooring 10 also includes four rectangular floor segments 16 wherein each rectangular floor segment 16 is between adjacent corner segments. Each corner floor segment 14 has a peripheral bevelled portion 18. Each rectangular floor segment 16 has a bevelled portion 20. When the flooring to is completely assembled, the corner floor segments 14 and the rectangular floor segments 16 are positioned so that the bevelled portions (18, 20) form a continuous bevelled surface along the periphery of the flooring 10.

Each interior floor segment 12 has a top surface 22 and a bottom surface 24, as well as four equal length sides (26, 28, 30, 32). A peripheral edge 34 defines the entire periphery of the interior floor segment 12 which has the four distinct sides 26, 28, 30, 32. A honeycomb structure 36 depends from the bottom surface 24 of the interior floor segment. The honeycomb structure 36 has a plurality of individual cells 38 which help provide the floor segment with its energy absorbing properties. Each side (26, 28, 30, 32) of the interior floor segment 12 has a pair of notches 40 therein wherein a portion of the honeycomb structure 36 and the adjacent peripheral edge 34 are absent. A plurality of connector posts 42 depend from the bottom surface in the area of each notch 40.

Each corner floor segment 14 has a top surface 44 and a bottom surface 46, as well as six distinct sides (47, 48, 50, 52, 54, 56). The two external sides (47, 48) define an outside corner of the corner floor segment. The remaining four sides (50, 52, 54, 56) are interior sides. A peripheral edge 58 defines the periphery of the interior sides (50, 52, 54, 56) of the corner floor segment 14. A honeycomb structure 60 depends from the bottom surface 46 of the corner floor segment 14. The honeycomb structure 60 has a plurality of individual cells 62 which help provide the floor segment with its energy absorbing properties. Each interior side (50, 52, 54, 56) of the corner floor segment 14 has a notch 64 therein wherein a portion of the honeycomb structure 60 and the adjacent peripheral edge 58 are absent. In the corner floor segment 14, the honeycomb structure 60 has three openings 66 where the honeycomb structure 60 is absent. A plurality of integral posts 42 depend from the bottom surface 46 in the area of the notch 64 and the area of the openings 66.

Each rectangular floor segment 16 has a top surface 70 and a bottom surface 72, as well as four sides (74, 76, 78, 80). One of the sides 74 is an exterior side and defines a part of the peripheral edge of the protective flooring. Three of the sides (76, 78, 80) are interior sides. A peripheral edge 82 defines the periphery of the interior sides (76, 78, 80) of the rectangular floor segment 16. A honeycomb structure 86 depends from the bottom surface 72 of the rectangular floor segment 16. The honeycomb structure 86 has a plurality of individual cells 88 which help provide the floor segment 16 with its energy absorbing properties. Each interior side (76, 78, 80) of the rectangular floor segment 16 has a notch 90 therein wherein a portion of the honeycomb structure 86 and the adjacent peripheral edge 82 are absent. There are a pair of openings 92 in the honeycomb structure 86. A plurality of connector posts 42 depend from the bottom surface 72 in the area of the notch 90 and the openings 92.

A connector 98 comprises a flexible prong 100 and an integral flat base 102. The prong 100 has two opposing parts 104, 106 separated by a gap 108 which provides for the flexibility of the prong. The forward end of the prong has an enlarged head 110 with a tapered forward surface 112 and a rearwardly facing shoulder 114. The base 102 has a plurality of apertures 116 therein. The apertures 116 have an orientation such that the connector posts, which are in the area of the various notches and openings of the corner, interior and rectangular floor segments, will pass therethrough. In practice, the connector 98 is formed as a part of each floor segment during the manufacturing process. The connector 98 is made fron an Ultramid resin which is a polyamide.

Figure 3:
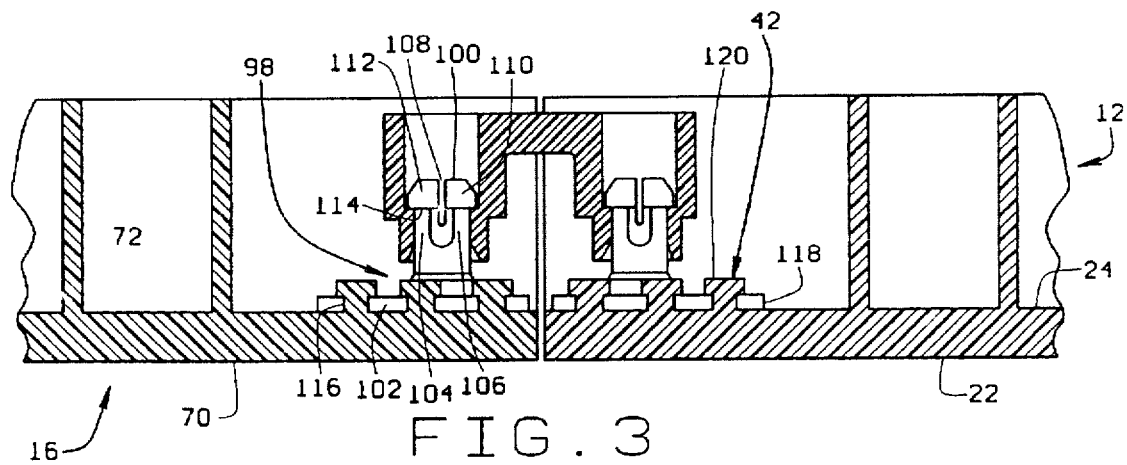
FIG. 3 is a cross-sectional view taken along section line 3—3 of FIG. 2 showing the joinder of adjacent floor segments.
Figure 2:
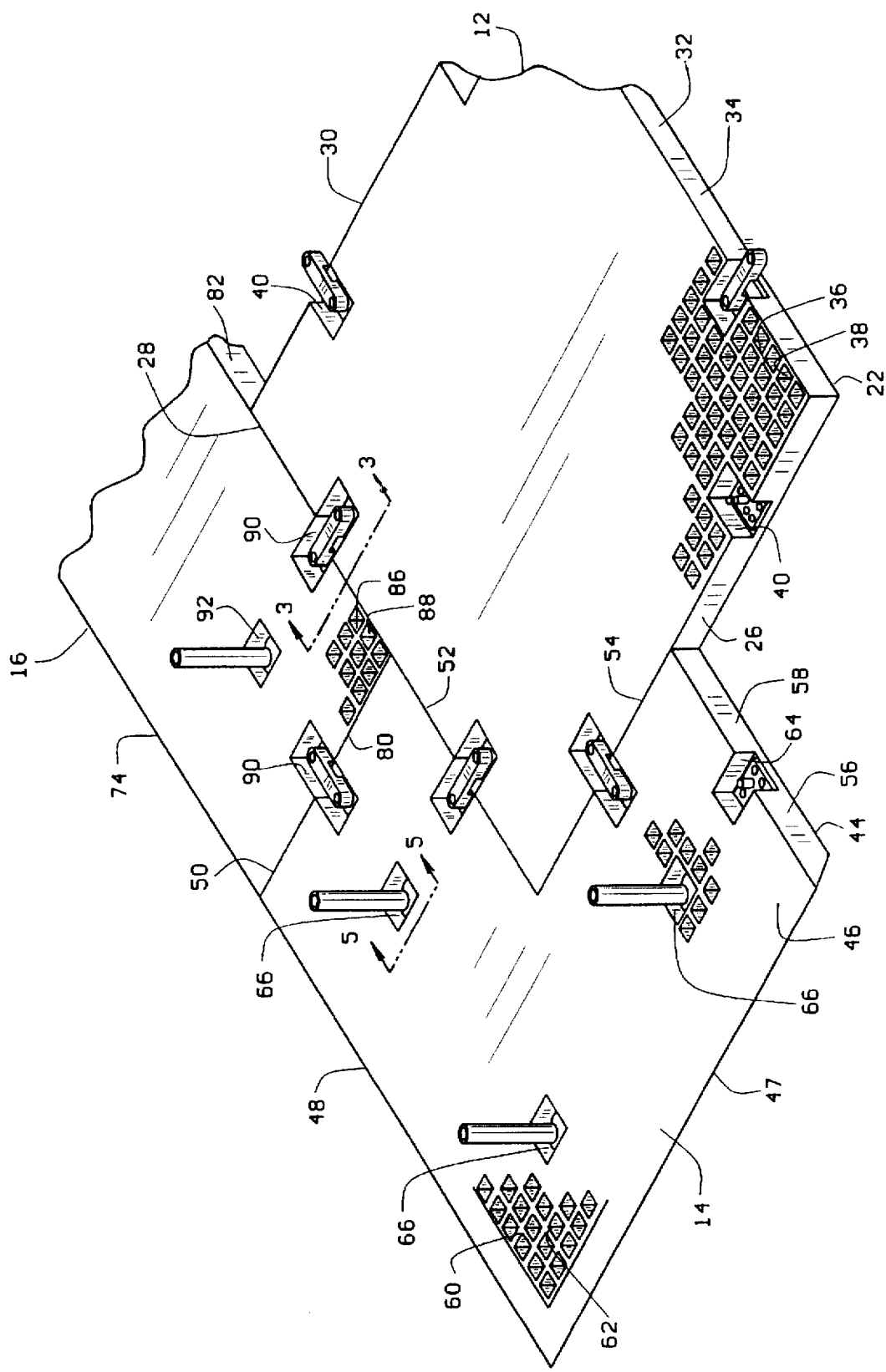
FIG. 2 is a perspective view of the bottom surfaces of a corner floor segment, a rectangular floor segment, and an interior floor segment showing the joinder of these segments as well as the honeycomb structure and the anchors.
Figure 5:
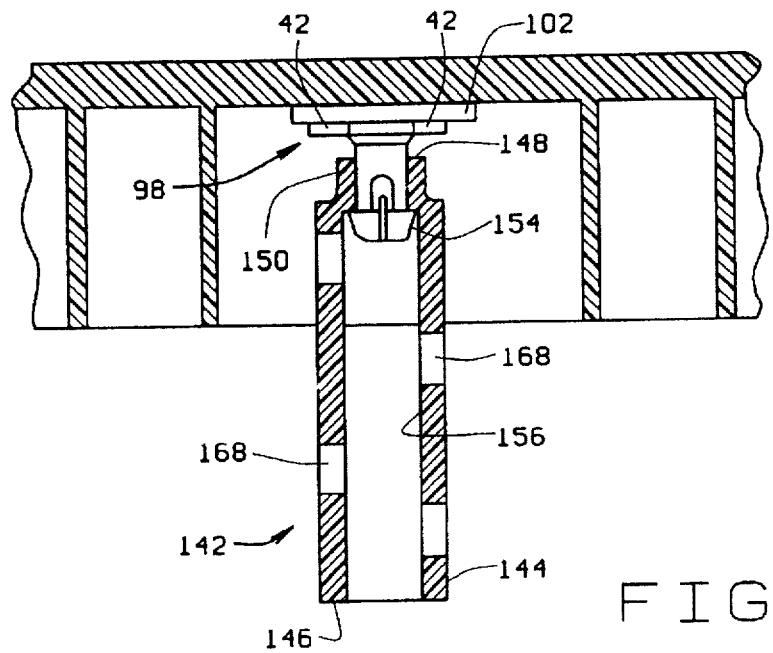
FIG. 5 is a cross-sectional view of the anchors shown connected to the bottom surface of the floor segment.
Figure 6:
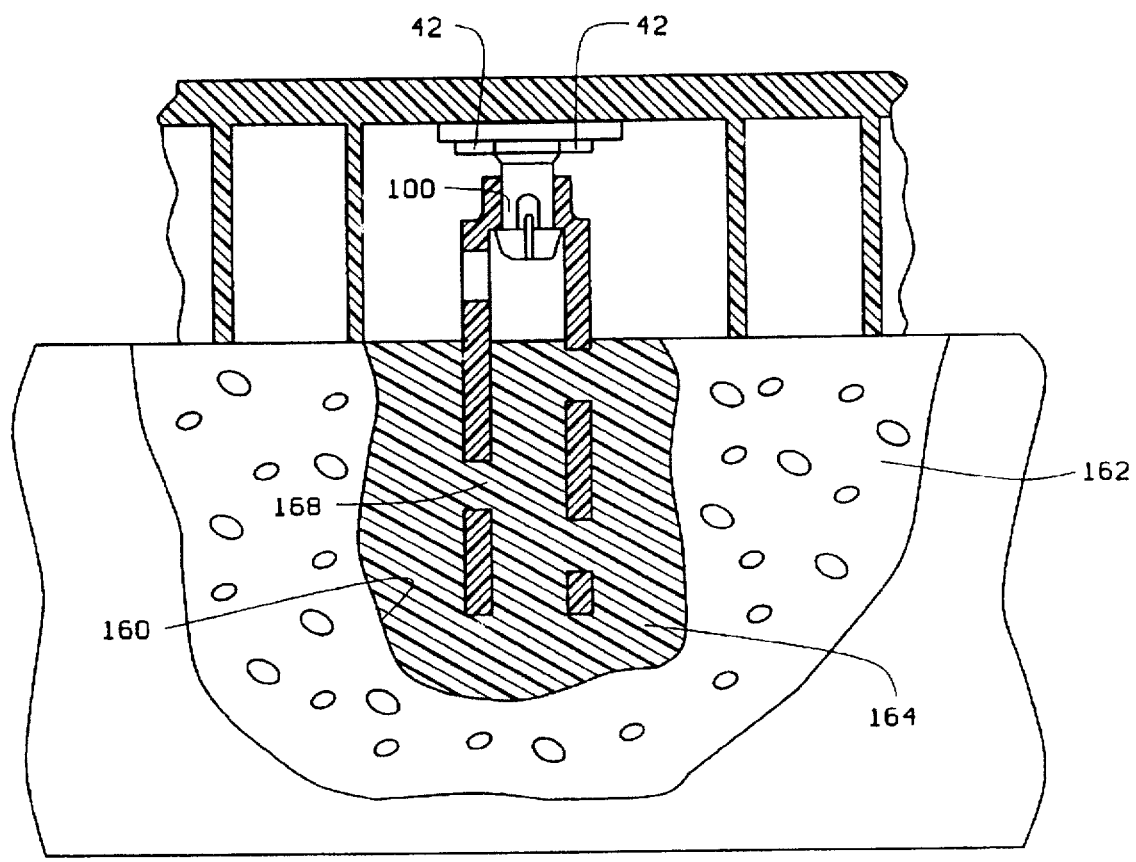
FIG. 6 is a sectional view showing the attachment of the floor segment to the ground via an anchor.

Referring to the joinder between the corner floor segment and rectangular floor segment (as shown in FIGS. 2 and 3), post 42 has an enlarged head 118 at the distal end 120 thereof so that the connector is permanently affixed to the bottom surface of the respective floor segment once the posts 42 have passed through the apertures in the base. In other words, the flat base 102 of the connector 98 is firmly secured between the bottom surface of the corresponding floor segment and the head of the post.

Referring to FIG. 2, one sees that a connector 98 is positioned within each notch of the various floor segments. The connector 98 is also positioned in the openings of the corner floor segment and the rectangular floor segment. At each location where a connector 98 is positioned, the prongs 100 depend from the connector 98 so as to be able to engage another member as will become apparent from the discussion hereinafter.

To join together the various floor segments, the notches for the adjacent floor segments must be positioned so as to be adjacent to each other. For example, the notches in the interior floor segment are adjacent to the notches in the adjacent corner floor segment. The notch in the interior floor segment is adjacent the notch in the rectangular floor segment. Once the notches have been placed so as to be adjacent to each other, i.e., the corresponding notches are in their corresponding positions, a U-shaped connector 126 is used to join together the adjacent floor segments. The U-shaped connector 126 is made from a polycarbonate resin wherein the preferred resin is MAKROLON 2500 supplied by Miles Laboratories.

The U-shaped connector 126 has a pair of elongate barrel portions 128 which are joined together by a central portion 130. For each elongate portion 128, it includes a bore 132 with a trumpet-shaped opening 134 with leads to a cylindrical portion 136 which, in turn, leads to another cylindrical portion 138, of a larger diameter. A rearwardly facing shoulder 140 defines the transition between the two cylindrical portions (136, 138).

The U-shaped connector 126 is positioned so that the trumpet shaped opening 134 of each elongate barrel portion 128 is placed over a corresponding pair of prongs, 100 of a connector 98. The connector 126 is forced toward the prongs 100 so that the prongs 100 compress thereby passing through the smaller diameter bore 136 and then expand upon reaching the larger diameter bore 138. The rearwardly facing shoulder of the prongs 100 and the barrel portion 128 engage each other so as to make it impossible to remove the U-shaped connector 126 from the prongs 100 of the connector 98 without physically destroying these components.

A cylindrical anchor 142 comprises a cylindrical tube 144 with opposite ends (146, 148). The portion of the tube 144 adjacent one end 148 has a reduced diameter portion 150 for a short distance of its length. A shoulder 154 defines the transition between the reduced diameter portion 150 and the larger diameter portion 156 of the tube 144.

To help anchor the complete floor assembly 10 to the ground, an anchor 142 is positioned on the prongs 100 of the connector 98 that is in selected openings in the corner floor segment and the rectangular floor segment. The rear shoulder of the prong engages the rear shoulder 154 of the anchor 142 so that the anchor 142 cannot be removed from the prongs 100 without physically destroying the components.

Holes 160 are drilled in the ground 162 where the floor assembly 10 is to be positioned. These holes 160 are filled with an epoxy resin 164 and the floor assembly 10 positioned so that the anchors 142 extend into the epoxy resin filled holes 160. The resin 164 flows into the volume of the bore (150, 156) of the anchor 142 through the holes 168 therein and about the exterior surface 170 of the anchor 142. The anchor 142 is secured within the hole 160 so that the floor assembly 10 cannot be removed without physically destroying the components.

It this can bee seen that the above invention provides a floor assembly that is securely anchored to the ground so that it resistant to vandalism and theft.

The floor segments are made from a material that is able to be manufactured into the appropriate shape and withstand the temperature extremes that exist for products that are used in conjunction with outdoor playground equipment.

Other specific embodiments of the invention will be apparent to those skilled in the art from a consideration of this specification or practice of the invention disclosed herein. It is intended that the specification and specific embodiments be considered as exemplary only, with the true scope and spirit of the invention being indicated by the following claims.

What is claimed:

1. A protective flooring comprising:
    a plurality of floor segments, each one of the floor segments having a top surface, a bottom surface, and an interior peripheral edge;
    at least one anchor connected to and depending from the bottom surface of selected ones of the segments, each one of the anchors comprising an elongate cylindrical tube with a central bore, and apertures that provide communication with the bore;

each floor segment including at least one notch in the peripheral edge thereof, a base connector being affixed to the bottom surface of the floor segment defined by the notch, when the floor segments are assembled, the notches in the peripheral edges of the adjacent floor segments correspond so that the respective base connectors are proximate to each other; and a U-shaped connector engaging each proximate pair of corresponding base connectors so as to join together the adjacent floor segments.

2. The protective flooring of claim 1 wherein the base connector comprises a flat base and an integral pair of compressible prongs, and each prong having an enlarged head at the distal end thereof that defines a shoulder.

3. The protective flooring of claim 2 wherein the U-shaped connector includes a pair of barrel portions, each barrel portion defines a bore that includes a shoulder, and each one of the barrel portions receiving the pair of compressible prongs of its corresponding base connector so that the shoulder of the prongs engages the shoulder of the bore of the barrel whereby the base connector is securely fastened to the U-shaped connector.

4. The protective flooring of claim 3 wherein each barrel portion includes an open end, the barrel being of a trumpet shape at the open end thereof.

5. The protective flooring of claim 2 wherein the anchor has a central bore defines a shoulder in the central bore for receiving compressible prong of a corresponding base connector so that the shoulder of the prongs engages the shoulder of the central bore of the anchor whereby the base connector is securely fastened to the anchor.

6. The protective flooring of claim 2 wherein the flat base includes a plurality of apertures.

7. The protective flooring of claim 6 wherein the bottom surface of each floor segment adjacent each of the notches therein contains a plurality of posts, each post has an enlarged head.

8. The protective flooring of claim 7 wherein selected ones of the apertures in the flat base receives one of the posts whereby the flat base is between the enlarged head of the post and the bottom surface of the floor segment.

* * * * *

UNITED STATES PATENT AND TRADEMARK OFFICE
CERTIFICATE OF CORRECTION

PATENT NO. : 5,713,175
DATED : February 3, 1998
INVENTOR(S) : Steven G. Mitchell It is certified that error appears in the above-identified patent and that said Letters Patent is hereby corrected as shown below:

Column 6, line 8, insert before "defines" --and--.

Column 6, line 9, insert after "receiving" --a--.

Signed and Sealed this

Ninth Day of June, 1998

*Attest:*

BRUCE LEHMAN

*Attesting Officer*  *Commissioner of Patents and Trademarks*